US008062452B2

(12) United States Patent
Lalande et al.

(10) Patent No.: US 8,062,452 B2
(45) Date of Patent: Nov. 22, 2011

(54) METHOD OF MAKING A UNIT COMPRISING A CASING AND DIVERGING PORTION

(75) Inventors: Joëlle Lalande, Bordeaux Cauderan (FR); Frédéric Ballion, Bordeaux (FR)

(73) Assignee: Snecma Propulsion Solide, Le Haillan (FR)

( * ) Notice: Subject to any disclaimer, the term of this patent is extended or adjusted under 35 U.S.C. 154(b) by 801 days.

(21) Appl. No.: 12/002,339

(22) Filed: Dec. 14, 2007

(65) Prior Publication Data
US 2008/0163976 A1 Jul. 10, 2008

(30) Foreign Application Priority Data

Dec. 15, 2006 (FR) ...................................... 06 55553

(51) Int. Cl.
*B65H 81/00* (2006.01)
(52) U.S. Cl. ........ 156/169; 156/173; 156/175; 156/189; 264/257
(58) Field of Classification Search .................. 156/166, 156/169, 170, 173, 175, 181, 182, 189; 264/257
See application file for complete search history.

(56) References Cited

U.S. PATENT DOCUMENTS

| 3,633,631 | A | * | 1/1972 | Hatch et al. ................... 138/141 |
| 3,991,248 | A | * | 11/1976 | Bauer ........................... 442/148 |
| 4,495,231 | A | * | 1/1985 | Laskaris et al. ............. 428/36.1 |
| 4,917,756 | A | * | 4/1990 | Cahuzac et al. .............. 156/429 |
| 5,217,766 | A | * | 6/1993 | Flonc et al. .................. 428/34.5 |
| 5,543,005 | A | * | 8/1996 | Monget et al. ................... 156/93 |
| 5,759,321 | A | * | 6/1998 | Cahuzac .......................... 156/93 |
| 5,876,322 | A | | 3/1999 | Piramoon |
| 5,914,002 | A | * | 6/1999 | Cahuzac .......................... 156/92 |
| 6,149,844 | A | * | 11/2000 | Graham .......................... 264/71 |
| 6,319,348 | B1 | * | 11/2001 | Olry et al. ..................... 156/181 |
| 6,967,014 | B1 | * | 11/2005 | Olry et al. .................. 423/447.9 |
| 6,972,064 | B2 | * | 12/2005 | Prince .......................... 156/192 |
| 7,384,585 | B2 | * | 6/2008 | Ishibashi et al. .............. 264/257 |
| 7,727,448 | B2 | * | 6/2010 | Boutefeu et al. .............. 264/257 |
| 2004/0074589 | A1 | * | 4/2004 | Gessler et al. ................ 156/155 |
| 2004/0130072 | A1 | * | 7/2004 | Sekido et al. ................. 264/408 |
| 2006/0118232 | A1 | * | 6/2006 | Chang et al. .................. 156/245 |
| 2007/0128392 | A1 | * | 6/2007 | Huang et al. ................. 428/36.1 |
| 2009/0121380 | A1 | * | 5/2009 | Olry et al. .................... 264/188 |

FOREIGN PATENT DOCUMENTS

| DE | 100 36 169 A1 | 2/2002 |
| DE | 103 20 791 A1 | 11/2004 |
| EP | 1 027 206 B1 | 5/2003 |
| FR | 2 184 594 A1 | 12/1973 |
| WO | WO 99/21697 | 9/1998 |
| WO | WO 2006/064167 A1 | 6/2006 |

* cited by examiner

*Primary Examiner* — Jeff Aftergut
(74) *Attorney, Agent, or Firm* — Weingarten, Schurgin, Gagnebin & Lebovici LLP

(57) ABSTRACT

The invention relates to a method of making a casing-and-diverging-portion unit, the method comprising the following steps:
  forming fiber reinforcement from a first fiber preform made with a first type of fiber and a second fiber preform made with a second type of fiber different from the first type of fiber, said second preform being placed on the first preform;
  maintaining the fiber reinforcement in tooling so that it has a shape identical to the shape of the casing-and-diverging-portion unit that is to be made; and
  impregnating said fiber reinforcement with a thermosetting resin and impregnating the resin.

18 Claims, 13 Drawing Sheets

METHOD OF MAKING A UNIT COMPRISING A CASING AND DIVERGING PORTION

This application claims priority to French application No. 06 55553 filed Dec. 15, 2006.

BACKGROUND OF THE INVENTION

The invention relates to making a casing-and-diverging-portion unit for use in particular in making components for rocket exhaust nozzles or outlet cones.

That type of part comprises an internal portion referred to as the "diverging portion", that is required essentially to present good ability at withstanding temperature and ablation since it is subjected directly to the flow of hot gas. The part also has an external portion, referred to as its "casing", having the main function of imparting good stiffness to the part.

Particularly because of the specific properties that the diverging portion and the casing need to present, these two portions are made separately. Thereafter they are united to form a casing-and-diverging-portion unit.

A method presently in use for forming composite diverging portions or casings consists in draping and molding plies of carbon fabric preimpregnated with a resin, e.g. a phenolic resin. More precisely, the method comprises draping plies of preimpregnated fabric in a rosette pattern on a mold presenting the shape of the unit to be made, compacting the plies in a vacuum by means of a diaphragm, installing a female mold if necessary, polymerizing the unit in an autoclave or a press, and unmolding the part. This produces a rigid part with fiber reinforcement.

There also exist other known methods of making composite diverging portions or casings such as methods comprising, for example, filamentary winding, braiding, or knitting sleeves.

Nevertheless, with those methods of fabrication, the number of components needed for making the casing-and-diverging-portion unit is relatively large, as is the time required, thus leading to a manufacturing cost that is high.

Furthermore, since the diverging portion and the casing are made separately, assembling these two elements together can be complex and can present difficulties of implementation. For example, aligning the contact surfaces between the casing and the diverging portion requires additional machining, thereby increasing the time and the cost of fabrication accordingly. In addition, bonding the two elements together requires the assembly surfaces to be prepared and good control over the adhesive used in order to obtain good adhesion at all points.

In addition, the above methods are difficult to implement. In particular, draping fiber plies to form the fiber reinforcement is a manual operation that is performed directly on a shaping support and that does not enable accurate control to be maintained over the orientation and the quantity of fibers at all points in the reinforcement.

Furthermore, most existing methods use preimpregnated fibers that are less flexible than dry fibers, thereby making it even more difficult to shape the plies to match the shape of a body of revolution such as a diverging portion and the associated casing.

OBJECT AND BRIEF SUMMARY OF THE INVENTION

The present invention seeks to remedy the drawbacks of prior art methods by proposing a method of making a casing-and-diverging-portion unit that enables the number of components and operations required for making it to be reduced.

This object is achieved by a method of making a casing-and-diverging-portion unit, the method comprising the following steps:

forming fiber reinforcement by making a first fiber preform with a first type of fiber, said first preform corresponding to the diverging portion of the casing-and-diverging-portion unit that is to be made, and making a second fiber preform with a second type of fiber, different from the first type of fiber, said second preform corresponding to the casing portion of the casing-and-diverging-portion unit that is to be made, and being placed on the first preform;

maintaining the fiber reinforcement in a shape identical to that of the casing-and-diverging-portion unit that is to be made; and impregnating said fiber reinforcement with a thermosetting resin and polymerizing the resin.

Thus, by making fiber reinforcement that combines the fiber preform for the diverging portion and the fiber preform for the casing, the method of the invention makes it possible to make a composite casing-and-diverging-portion unit with a minimum of operations. Once made, the fiber reinforcement is impregnated on a single occasion with a resin that, once polymerized, constitutes a matrix that is common both to the diverging portion and to the casing, so as to make both of those two structures within a single part. The number of operations needed for making the casing-and-diverging-portion unit is considerably reduced. In addition, by making common fiber reinforcement using two "dry" fiber preforms corresponding respectively to the diverging portion and to the casing portion, it is relatively easy to fit those two portions to each other since fiber preforms made of dry fibers lend themselves to being shaped.

Furthermore, reducing the number of components and operations required for making the casing-and-diverging-portion unit obtained by the method of the invention serves to reduce manufacturing costs considerably, in particular because it is possible to use single tooling for making the fiber reinforcement and single tooling for performing resin impregnation and polymerization using a single injection and polymerization cycle. With the method of the invention there is no need for any intermediate machining and adhesive bonding.

The first type of preform that is to form the diverging portion is made using fibers that present low thermal conductivity, fibers presenting thermal conductivity of less than 50 watts per meter per kelvin ($W \cdot m^{-1} \cdot K^{-1}$), and preferably less than 20 $W \cdot m^{-1} \cdot K^{-1}$. Such fibers may be constituted in particular by pitch-precursor carbon fibers, by polyacrylonitrile-precursor (PAN-precursor) carbon fibers, or by rayon-precursor carbon fibers.

The second fiber preform, that is to form the casing portion, is made with fibers that present traction strength of at least 3000 megapascals (MPa) and preferably strength that is greater than or equal to 3400 MPa. Such fibers also present a Young's modulus or elasticity modulus of at least 200 gigapascals (GPa). Such fibers may be constituted in particular by PAN-precursor carbon fibers or by pitch-precursor carbon fibers.

In an aspect of the invention, the first fiber reinforcement is made from a plurality of annular fiber plies, each comprising at least a first series of fibers oriented at an angle $\alpha$ and a second series of fibers oriented at an angle $-\alpha$. The annular fiber plies are stacked on tooling of conical shape or egg-cup shape, each ply being placed on said tooling at an angle β relative to the axis of the tooling.

The first and second series of fibers in each annular fiber ply are made by automatically placing and stitching fibers between two canvases that define an annular space, each ply being removed from the canvases by being cut out after a circular connection has been made in said ply. In this way, the fiber plies for forming the preform of the diverging portion can be made flat between two canvases, thus making it possible to control accurately the orientation of the fibers. In addition, by using an automatic embroidery machine for placing the fibers between the two canvases, it is possible to automate fiber placement and to form fiber plies that are identical, in particular in terms of the orientations and quantities of fibers used.

In an implementation, the second preform is made from at least first and second superposed fiber plies, the first ply having fibers oriented in a determined direction, the second ply being made by disposing on the first ply a ply of fibers that are oriented perpendicularly to the fibers of the first ply. The first ply is made by automatically placing and stitching fibers between two canvases defining an annular space, the ply being removed from the canvases by being cut out after a circular connection has been made in said ply, and the second ply being made by filamentary winding on the first ply while it is held in shape on tooling that is egg-cup shaped or conical.

In another implementation, the second fiber preform is made from at least one fiber ply comprising at least first and second series of superposed fibers, the first series having fibers oriented at an angle α and a second series having fibers oriented at an angle −α. The first and second series of fibers in each fiber ply are made by automatically placing and stitching fibers between two canvases defining an annular space, each ply being removed from the canvases by being cut out after a circular connection has been made in said ply.

The second fiber preform may be made either independently of the first preform, or else directly on the first fiber preform.

The fiber reinforcement made up of the superposed first and second fiber preforms is then placed in tooling, the tooling comprising a mold core and an outer mold defining an internal space in which the reinforcement is held. The thermosetting resin is then injected into the base of the reinforcement with a pressure gradient being established inside said internal space so as to cause the resin injected into the base of the reinforcement to flow up towards the top of said reinforcement. Injection and polymerization are thus performed using the same tooling and in a single cycle.

The thermosetting resin is a polyaddition resin presenting structural characteristics and having a coke fraction of at least 50%.

BRIEF DESCRIPTION OF THE DRAWINGS

Other characteristics and advantages of the invention appear from the following description of particular implementations of the invention given as non-limiting examples, with reference to the accompanying drawings, in which.

DETAILED DESCRIPTION OF IMPLEMENTATIONS OF THE INVENTION

The present invention proposes a method of making a casing-and-diverging-portion unit that mainly comprises forming a fiber reinforcement from two types of fiber and impregnating the reinforcement with a resin to form a matrix. The fiber reinforcement is constituted by two fiber preforms corresponding respectively to the diverging portion and to the casing of the unit that is to be made.

The first preform, which is to form the fiber reinforcement corresponding to the diverging portion, is made with a first type of refractory fibers that present in particular low thermal conductivity, i.e. fibers presenting thermal conductivity of less than about 50 W·m$^{-1}$·K$^{-1}$, and preferably less than 20 W·m$^{-1}$·K$^{-1}$. By way of example, this first type of fiber may correspond to pitch-precursor, PAN-precursor, or rayon-precursor carbon fibers.

The second preform, which is to form the fiber reinforcement corresponding to the casing, is formed with a second type of fibers that present in particular great mechanical strength, i.e. fibers presenting traction strength of at least 3000 MPa, preferably greater than or equal to 3400 MPa, and also presenting a Young's modulus or elasticity modulus of not less than 200 GPa. The fibers of this second type may be constituted in particular by PAN-precursor or pitch-precursor carbon fibers.

The first fiber preform corresponding to the diverging portion of the casing-and-diverging-portion unit that is to be made is itself formed from a stack of fiber plies.

Figure 1:
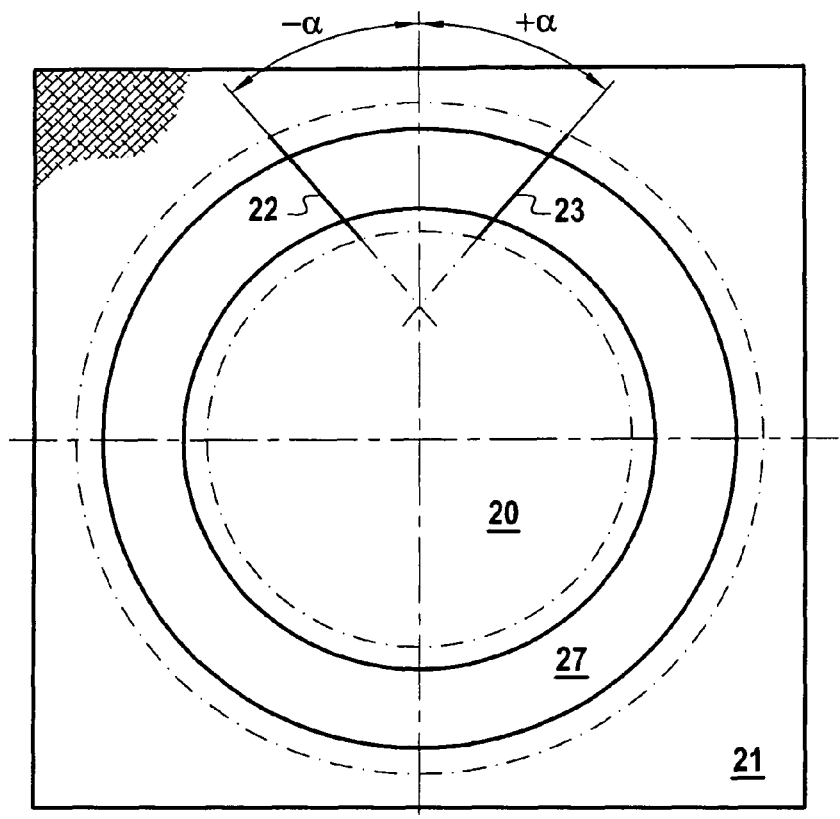
FIG. 1 is a plan view showing the placing of fibers in two distinct orientations in accordance with an implementation of the invention.

In an implementation of the invention, each fiber ply is initially made flat on canvasses. In this implementation shown in FIG. 1, each fiber ply is constituted by a plurality of series of fibers 22 and 23, e.g. pitch-precursor carbon fibers, that are placed respectively with two different orientations. This fiber placement with two different orientations confers on the resulting part the ability to withstand mechanical stresses in different directions.

The fiber ply is made from two canvases 20 and 21 defining an annular space 27. The canvases 20 and 21 define respectively the inner periphery and the outer periphery of the annular space 27, which space is of a width l that is selected to be slightly greater than the dimensions required for the ply.

The series of fibers 22 and 23 are put into position by using the so-called tailored fiber placement (TFP) technique, i.e. by programming an automatic embroidery machine so that it places and stitches the fibers 22 and 23 on the canvas at respective angles α and –α. The angles α and –α may correspond for example respectively to about +45° and –45°. The TFP technique consists in placing and fixing fibers by means of stitches at precise locations on a backing (canvas) by using an automatic embroidery machine.

Nevertheless, in the present invention, the TFP technique is used in a different manner. As described for example in document US 2004/0074589, the TFP technique is used for placing and stitching fibers on a backing that forms an integral portion of the ply. In the present invention, backings (canvases) are used differently, merely to define the shape and the dimensions of the fiber ply that is to be made. The backing is not to be found in the final fiber ply. If the usual TFP technique were to be used, then the fiber ply embroidery on the backing would present excessive stiffness and would not be suitable for being deformed so as to fit closely, e.g. to a three-dimensional surface of revolution that is not capable of being developed.

Figure 2:
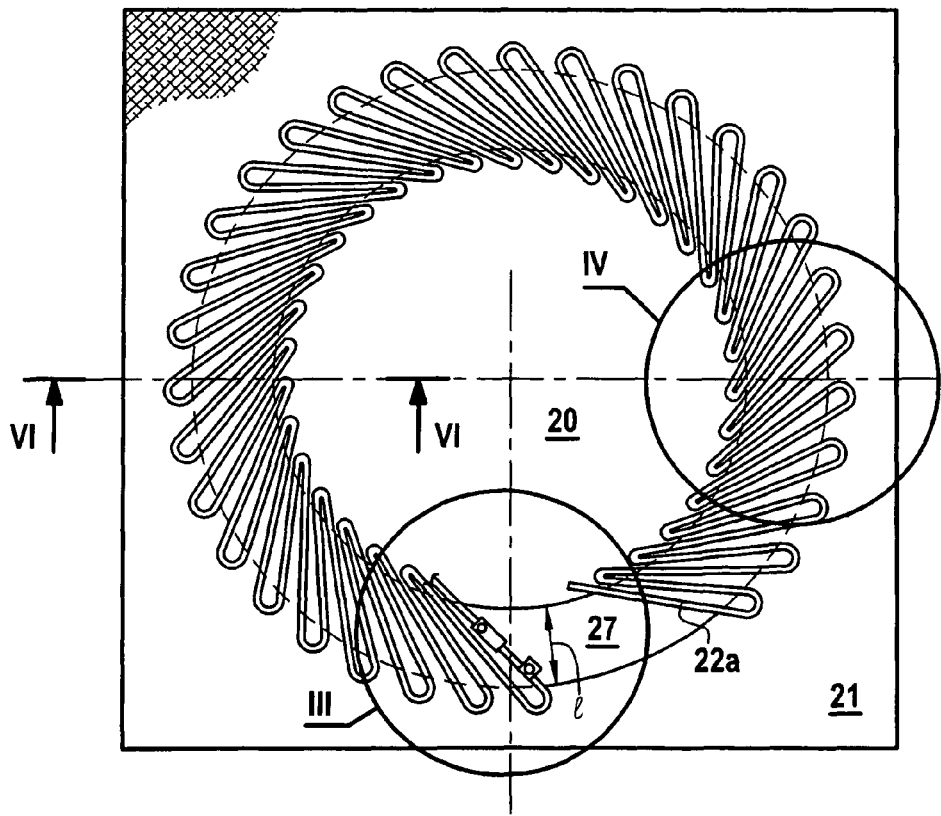
FIG. 2 is a diagrammatic plan view showing the placing of a first series of fibers between two canvases in accordance with an implementation of the invention.
Figure 3:
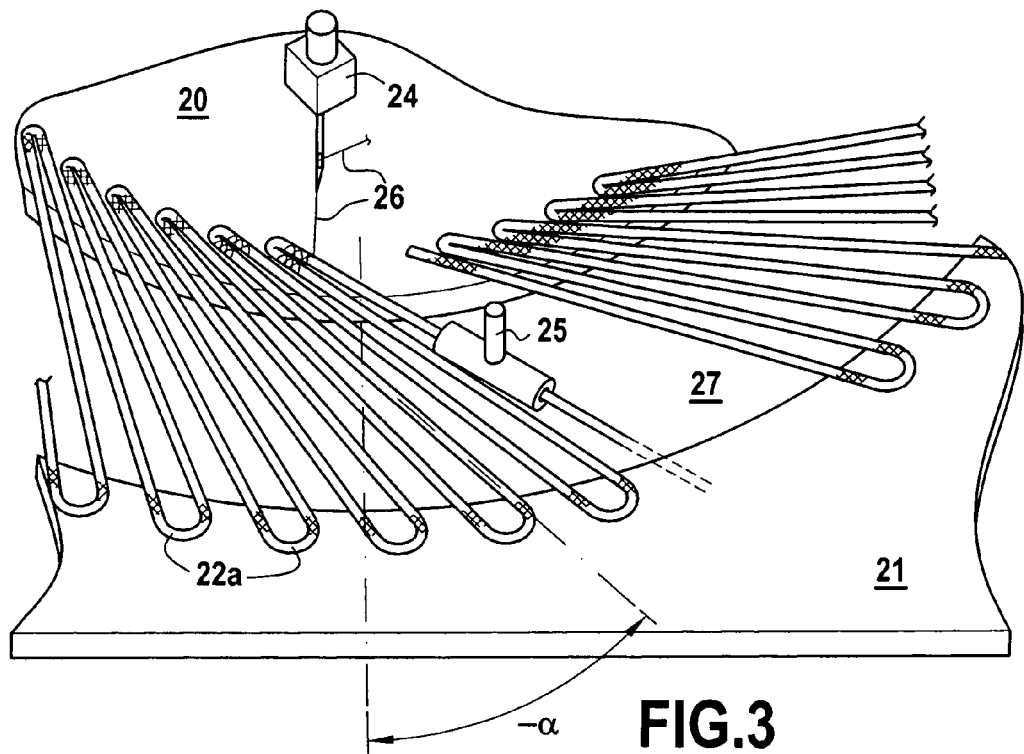
FIG. 3 is an enlarged perspective view of a portion (reference III) of FIG. 2 showing the placing and the stitching of fibers by an automatic embroidery machine.

Concretely, and as shown by way of example in FIGS. 2 and 3, the machine places a first series of fibers 22a in the annular space 27 at the angle –α. For this purpose, the machine delivers the fibers 22a from a reel (not shown), e.g., containing ex-pitch fiber yarns and it positions them by means of a guide 25 in the annular space 27. To hold the fibers as placed in this way, the machine has a stitching head 24 that stitches the fibers at their ends to the canvases 20 and 21 using a yarn 26 that is very fine, e.g., of polyethylene or of polyester. The placing and the stitching of the fibers are programmed in the numerical control of the machine.

Figure 4:
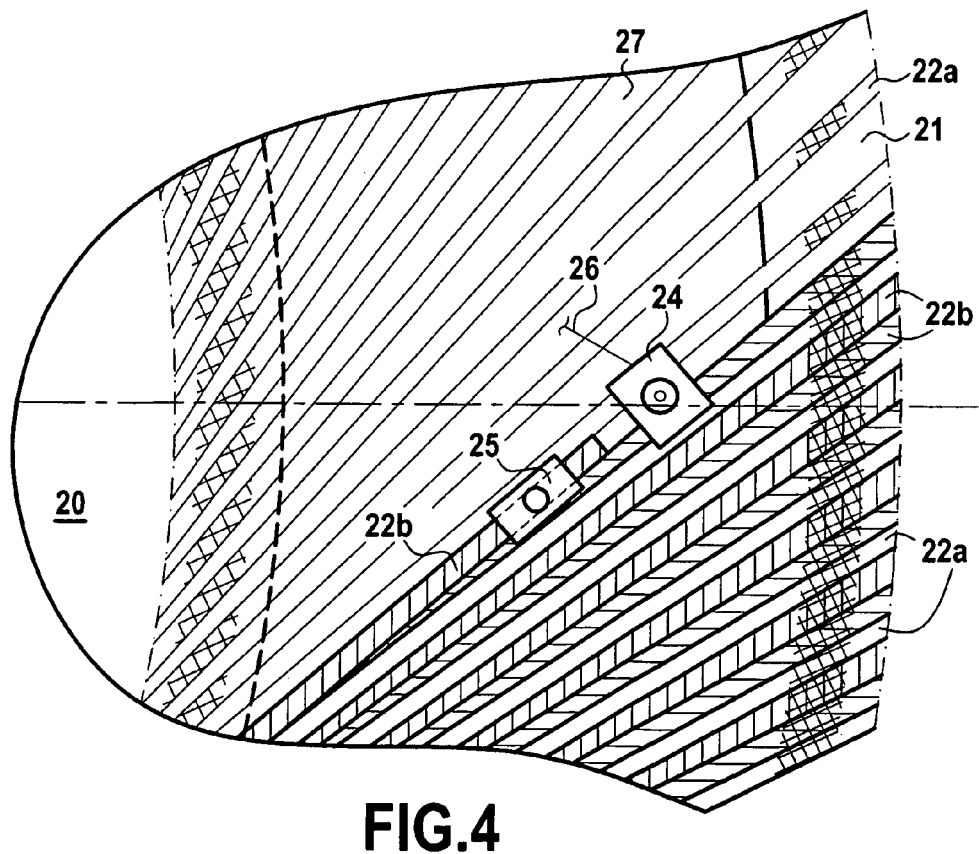
FIG. 4 is an enlarged view of a portion (reference IV) of the series of fibers of FIG. 2 in which the placement and stitching of additional fibers is performed by an automatic embroidery machine.

Because of the annular shape of the space 27 and the radial placing of the fibers therein, there remains gaps between the fibers placed by the machine, which gaps become greater on approaching the outer periphery of the annular space. In order to conserve a fiber density that is substantially identical at all points of the ply, additional fibers 22b of various lengths are added in the gaps left between the fibers 22a, as can be seen in FIG. 4. Under such circumstances, the automatic embroidery machine is programmed to fill the empty spaces between the fibers 22a by placing the additional fibers 22b in said spaces and by stitching them to the adjacent fibers.

Figure 5A:
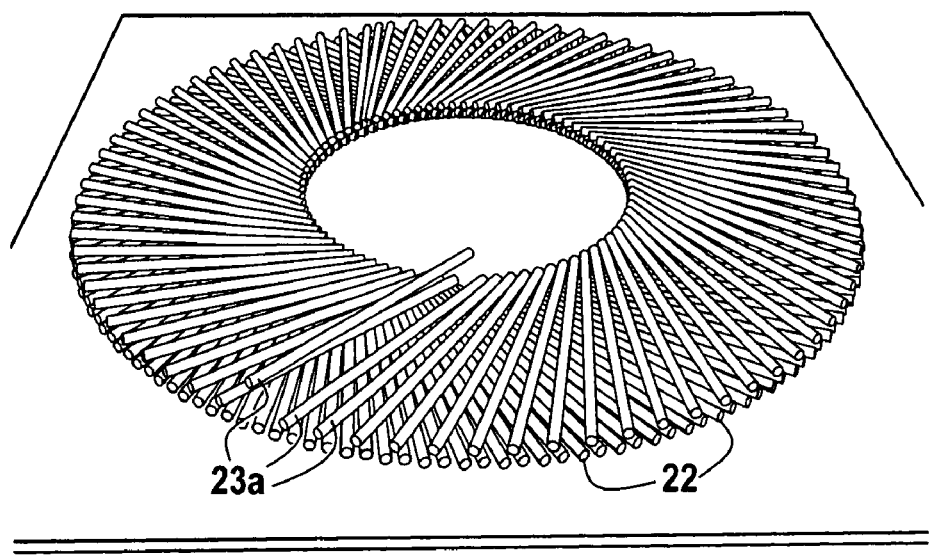
FIGS. 5A and 5B are diagrammatic views showing the making of a fiber ply having fibers in two distinct orientations.
Figure 5B:
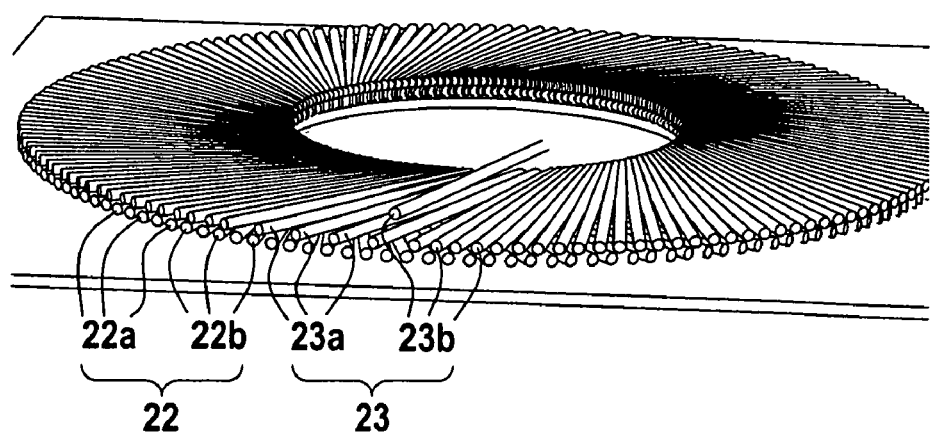

As shown in FIG. 5A, the embroidery machine then places a series of fibers 23a at the angle –α on the series of fibers 22 (comprising the fibers 22 and 22b). Additional fibers 23b are then added to fill in the gaps present between the fibers 23a (FIG. 5B) so as to form a second series of fibers 23 (fibers 23a and 23b).

These steps may optionally be repeated to form a plurality of series of superposed fibers that are disposed respectively at the angles –α and α.

Figure 6:
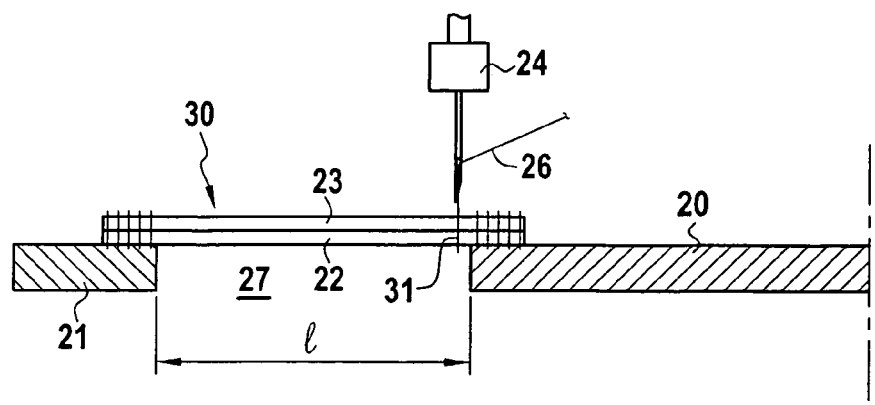
FIG. 6 is a half-section view on reference VI-VI showing the fiber ply of FIG. 2 and showing how a circle of stitching is made.
Figure 7:
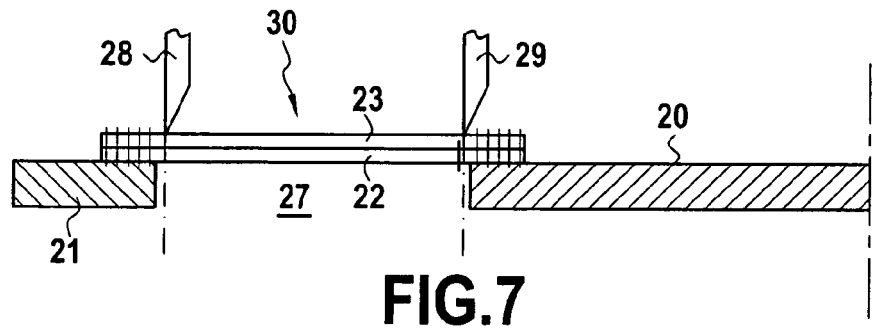
FIG. 7 is a half-section view on reference VI-VI of the FIG. 2 fiber ply showing the removal of the ply from the canvases.

Once all these spaces have been filled in, the annular space 27 is filled by a ply 30 containing at least two series of fibers 22 and 23 oriented in two different directions. A circle of stitching 31 is then made (FIG. 6) in the vicinity of the inner periphery of the annular space in order to hold the fibers before removing the fiber ply 30 from the canvas, which may be done, for example, by cutting through the ply 30 along the inner and outer peripheries of the annular space 23 using cutter tools 28 and 29 (e.g. knives, electric scalpels, jets of water under pressure, lasers, etc.) (FIG. 7).

Figure 8:
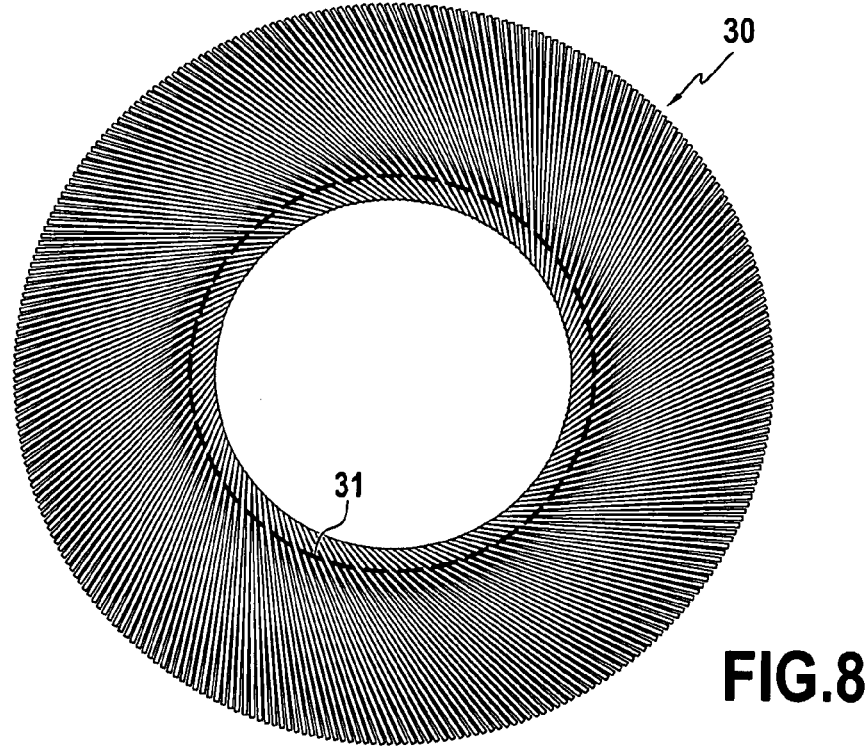
FIG. 8 is a diagrammatic plan view showing the fiber ply of FIG. 2 after placing the two series of fibers, adding the additional fibers, and removing the canvasses.

This provides a fiber ply 30 (FIG. 8) in which the fibers are held to one another by the circular stitching 31 while conserving very great flexibility, thus making it easy to position on tooling.

Figure 9:
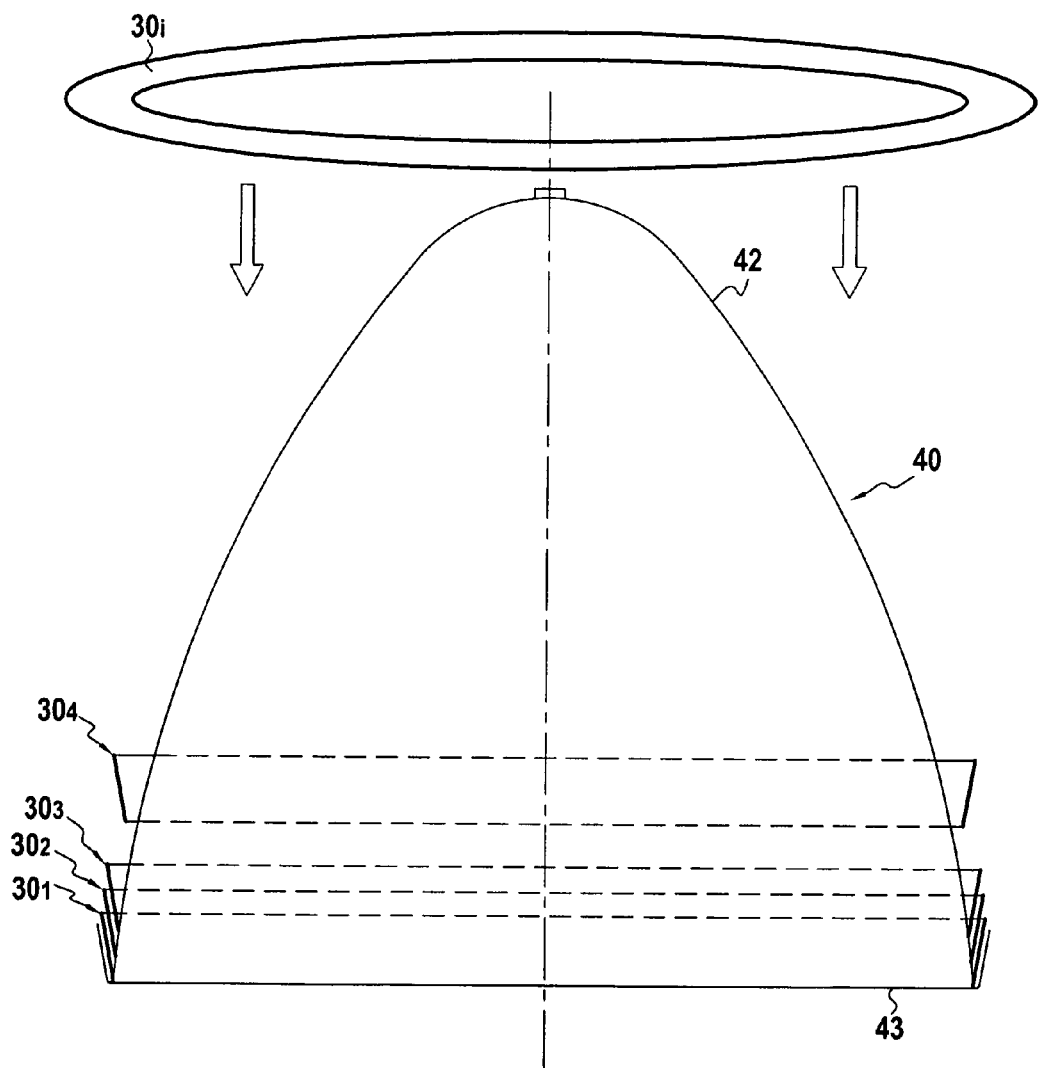
FIG. 9 is a diagrammatic view showing a preform of the diverging portion being made by stacking plies on tooling.
Figure 10:
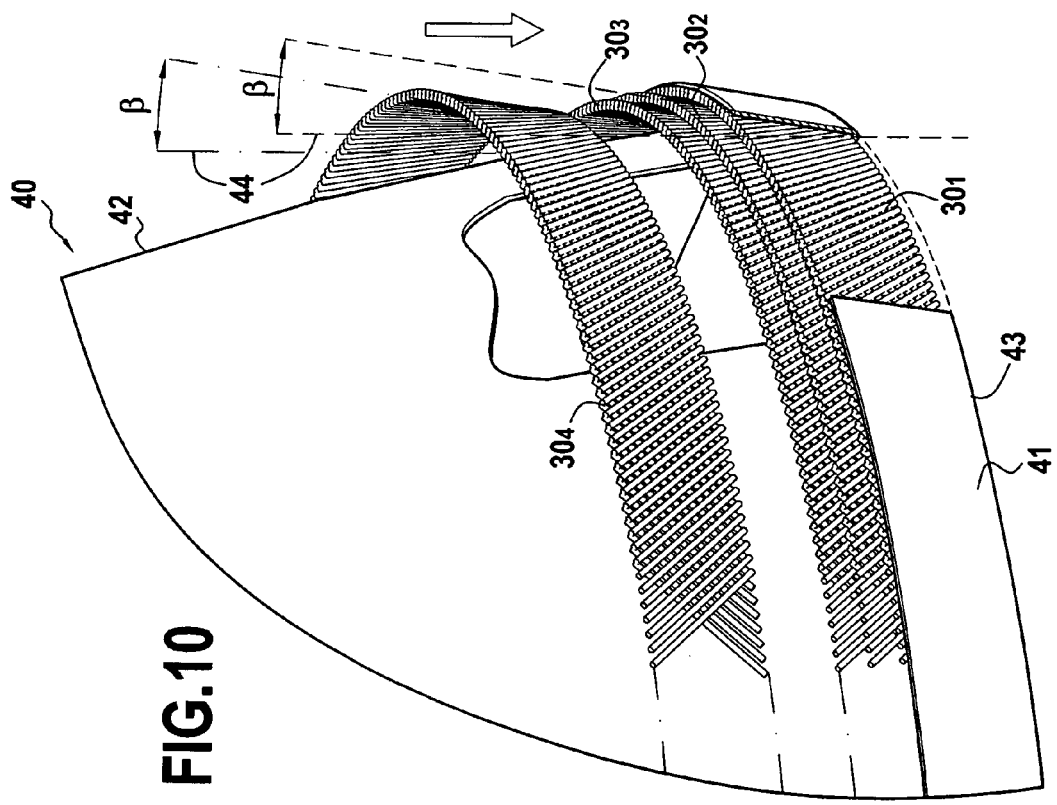
FIG. 10 is a fragmentary perspective view showing the disposition of the stacked plies of FIG. 9 in detail.

The fiber preform corresponding to the diverging portion of the casing-and-diverging-portion unit is made from a stack comprising a plurality of fiber preforms all made in the manner described above for the fiber ply 30. More precisely, as shown in FIGS. 9 and 10, a plurality of plies $30_1$, $30_2$, $30_3$, $30_4$, . . . , $30_i$ are stacked on tooling 40 presenting an egg-cup shape and corresponding to the shape of the diverging portion that is to be made. The plies $30_1$ to $30_i$ are made with respective inside diameters that decrease so as to match the progressive decrease in diameter of the tooling between its base 43 and its top 42. The plies $30_1$ to $30_i$ may also be made with respective annular widths that increase progressively so as to increase the wall thickness of the diverging portion on approaching the top 42 of the tooling 40. As shown in FIG. 10, the plies are preferably disposed on the tooling in such a manner as to form an angle β of about 10° relative to an axis 44 parallel to the axis of the diverging portion. For this purpose, the tooling 40 includes at its base 43 a rim 41 that enables the first stacked plies to be held at the angle β, with the subsequent plies conserving this orientation in the stack.

Figure 11:
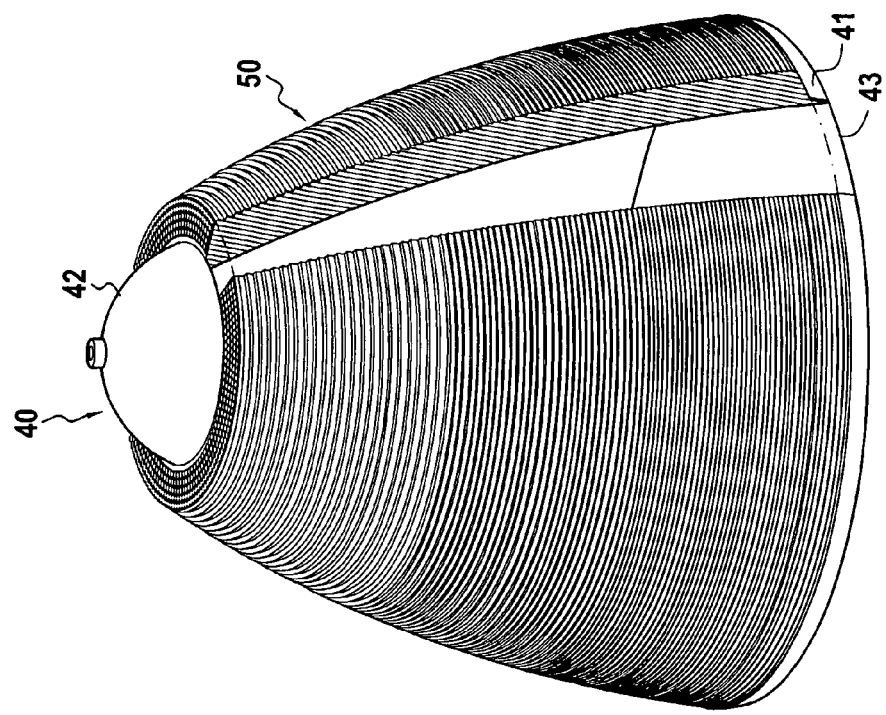
FIG. 11 is a diagrammatic perspective view of the fiber preform of the diverging portion made on the tooling of FIG. 9.

FIG. 11 shows a fiber preform 50 for a diverging portion obtained after stacking all of the annular plies between the base 43 and the top 42 of the tooling 40 as described above.

In a particular implementation of the invention, the second fiber preform corresponding to the "casing" portion of the casing-and-diverging-portion unit that is to be made is formed by superposing at least one fiber ply having fibers oriented in a first direction corresponding to the axis of the weave and referred to as the "ply at 0°" and another ply in a second direction perpendicular to the axis of the weave and to the fibers of the ply at 0°, and referred to as a "ply at 90°". This superposition of these two plies can be repeated a plurality of times as a function of the stiffness required for the casing.

Figure 12:
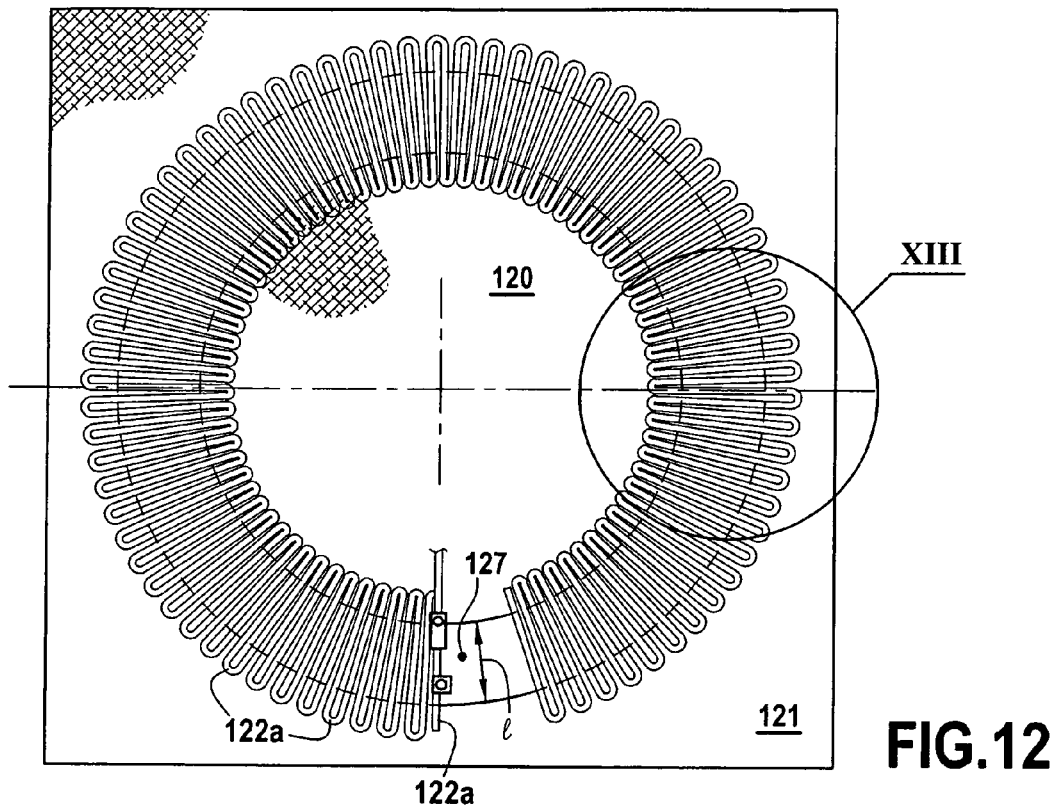
FIG. 12 is a diagrammatic plan view showing a fiber ply being made in accordance with another implementation of the invention.

Each ply at 0° is made in the same manner as that described above for making the plies constituting the diverging portion of the fiber reinforcement for the casing-and-diverging-portion unit, i.e., and as shown in FIG. 12, by placing fibers 122a, e.g. PAN-precursor carbon fibers, radially between two canvases 120 and 121 defining an annular space 127 of width l that is selected to be slightly greater than the dimensions needed for the ply at 0°. The fibers 122a are put into position using the TFP technique, i.e. by programming the automatic embroidery machine so that it places and stitches the fibers 122a so as to fill the annular space 127 as well as possible.

Figure 13:
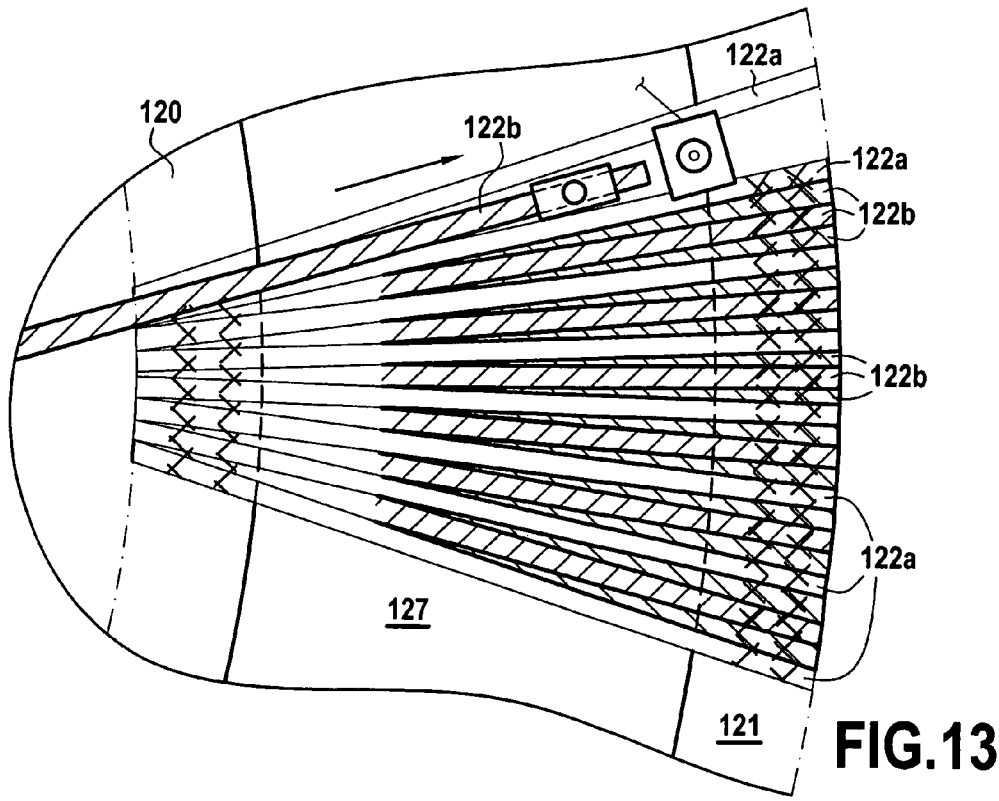
FIG. 13 is an enlarged view of a portion (reference XIII) of the FIG. 12 ply on which the additional fibers are placed and stitched by an automatic embroidery machine.

As described above, in order to conserve a substantially identical fiber density at all points of the ply, the automatic embroidery machine is programmed to fill the empty gaps between the fibers 122a by placing additional fibers 122b in these gaps and by stitching them to the adjacent fibers (FIG. 13).

Once all the gaps have been filled in, the annular space 127 contains a ply with fibers at a density that is substantially constant at all points. A circle of stitching is then made in the vicinity of the inner periphery of the annular space so as to hold the fibers together before removing the fiber ply from the canvases.

Figure 14:
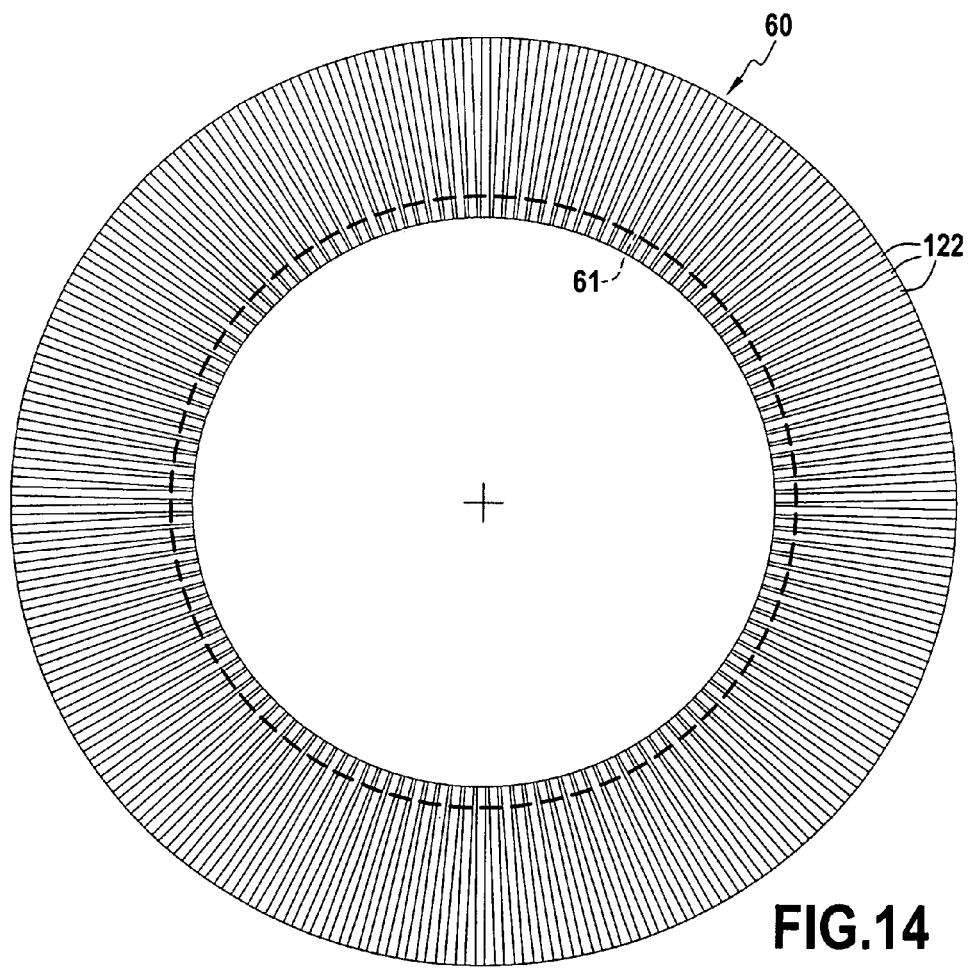
FIG. 14 is a diagrammatic plan view showing the fiber ply of FIG. 12 after additional fibers have been added and the canvasses removed.

FIG. 14 shows a ply at 0° 60 after it has been removed from the canvases and in which the fibers 122 (comprising fibers 122a and 122b) are held together by the circle of stitching 61, thus enabling them to retain a high degree of flexibility, making it easy for them to take up the shape of the shaping tooling.

Figure 15:
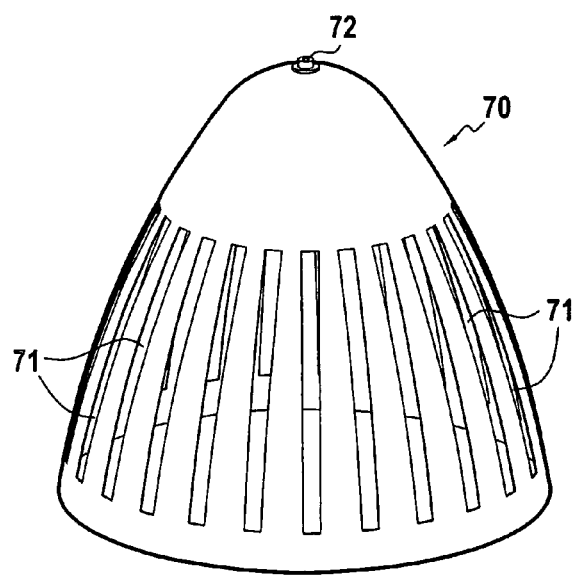
FIG. 15 is a diagrammatic perspective view of shaping tooling used for manufacturing a fiber preform for the casing portion.
Figure 16:
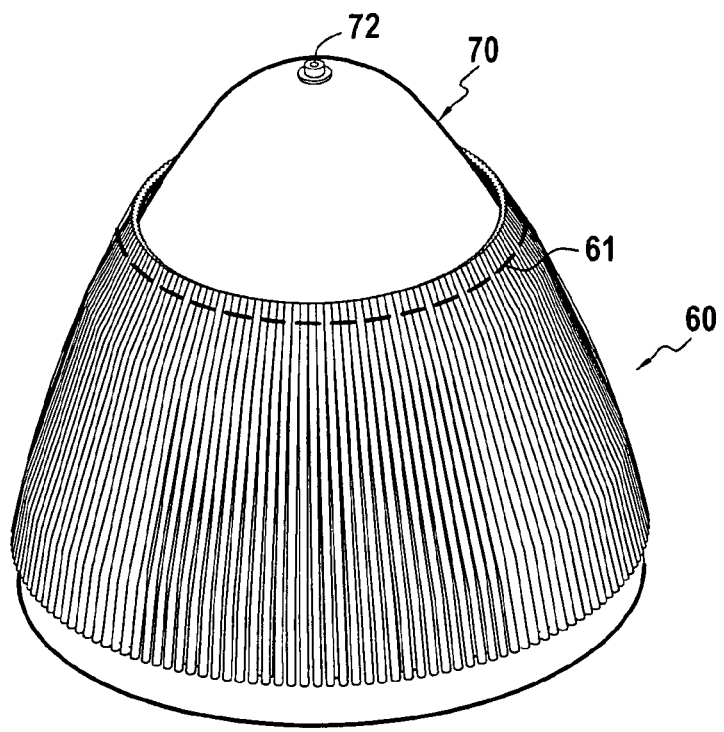
FIG. 16 is a diagrammatic perspective view of the FIG. 15 tooling with the FIG. 14 fiber ply placed thereon.
Figure 17:
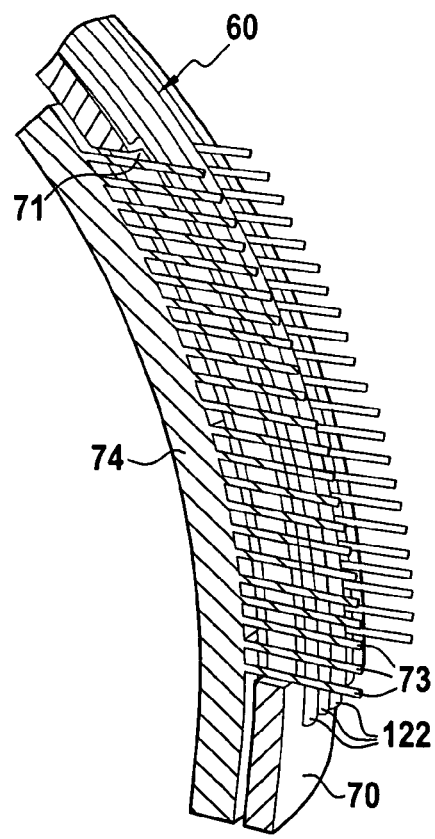
FIG. 17 is a diagrammatic detail view showing the positioning of strips of pins in the FIG. 16 tooling.

FIG. 15 shows an example of such tooling 70 suitable for use in making a ply at 90° on the ply at 0°. The tooling 70 is egg-cup shaped, corresponding to the shape of the fiber preform for the casing that is to be made and it includes slots 71 suitable for passing pins that are used for making one of the plies at 90°. FIG. 16 shows the fiber ply at 0° 60 once in position on the tooling 70 (i.e. once it has been shaped thereon). Since the fibers 122 are relatively free beside the outer periphery of the ply 60, this outer periphery fits closely to the spherical shape of the tooling 70. Thereafter, a strip 74 supporting pins 73 is positioned in each slot 71 of the tooling (FIG. 17).

Figure 18:
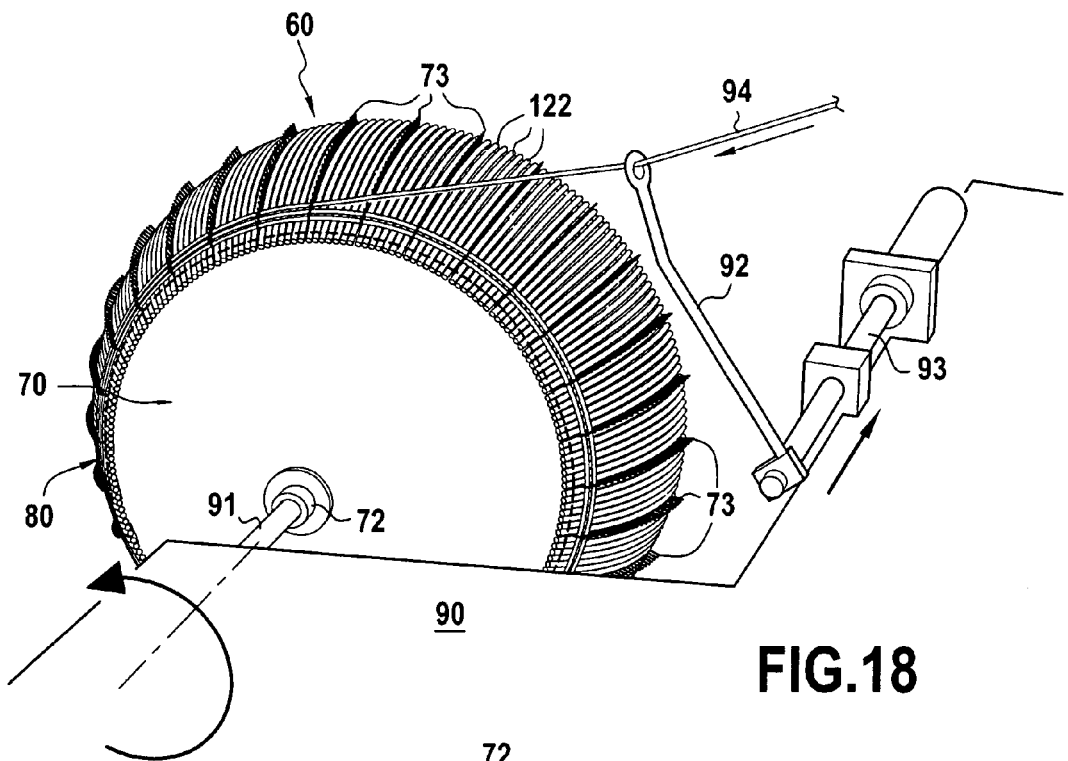
FIG. 18 is a diagrammatic perspective view of a filamentary winding installation.

A ply at 90° 80 is then made directly on the ply at 0° 60 by filamentary winding (FIG. 18). For this purpose, the top 72 of the tooling 70 is secured to a mandrel 91 of a winding machine 90. In this way, the machine 90 rotates the tooling 70 while continuously delivering a yarn 94 via a yarn guide 92 mounted on an arm 93 that is displaced as winding progresses so as to form successive loops on the ply 60, which loops are held between the pins 73. The yarn 94 is preferably made of the same material (e.g. PAN-precursor carbon fibers) as the material making up the fibers 122 of the ply at 0° 60.

Figure 19:
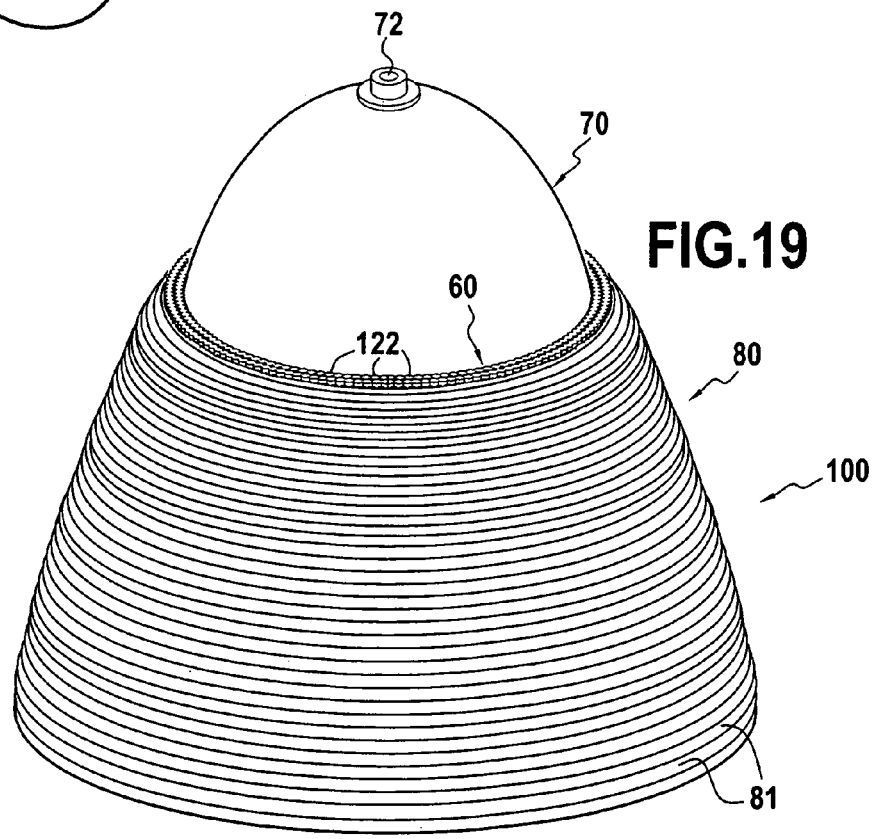
FIG. 19 is a diagrammatic perspective view of the FIG. 16 tooling further including, on the fiber ply, a ply of filamentary winding.

When winding has finished, the ply at 0° 60 is completely covered by a ply at 90° 80 (FIG. 19), i.e. a ply having fibers 81 that are oriented perpendicularly relative to the fibers 122 of the underlying ply 60.

A fiber preform 100 corresponding to the casing portion of the casing-and-diverging-portion unit that is to be made is thus itself made by alternating at least one fiber ply at 0° 60 with at least one ply at 90° 80 made by winding on the tooling 70. Each ply at 0° is made using the above-described method, possibly on each occasion slightly increasing the width of the layer 60 so as to take account of the increasing volume of the stack.

In a variant implementation, the fiber preform corresponding to the casing portion may also be made from one or more plies similar to the above-described ply 30 for the diverging portion, i.e. plies each comprising two series of fibers disposed respectively at angles α and −α that may possibly correspond to +45° and −45°, for example. The method of fabricating these plies is identical to that described above for fabricating the ply 30 and is consequently not described again. The ply(ies) fabricated in this way for forming the fiber preform of the casing differ(s) from those made for the preform of the diverging portion in that they present greater width in order to enable each of them to cover the working surface of the tooling 70 corresponding to the surface of the casing that is to be made (the surface covered by the ply 60 in FIG. 16).

Figure 20:
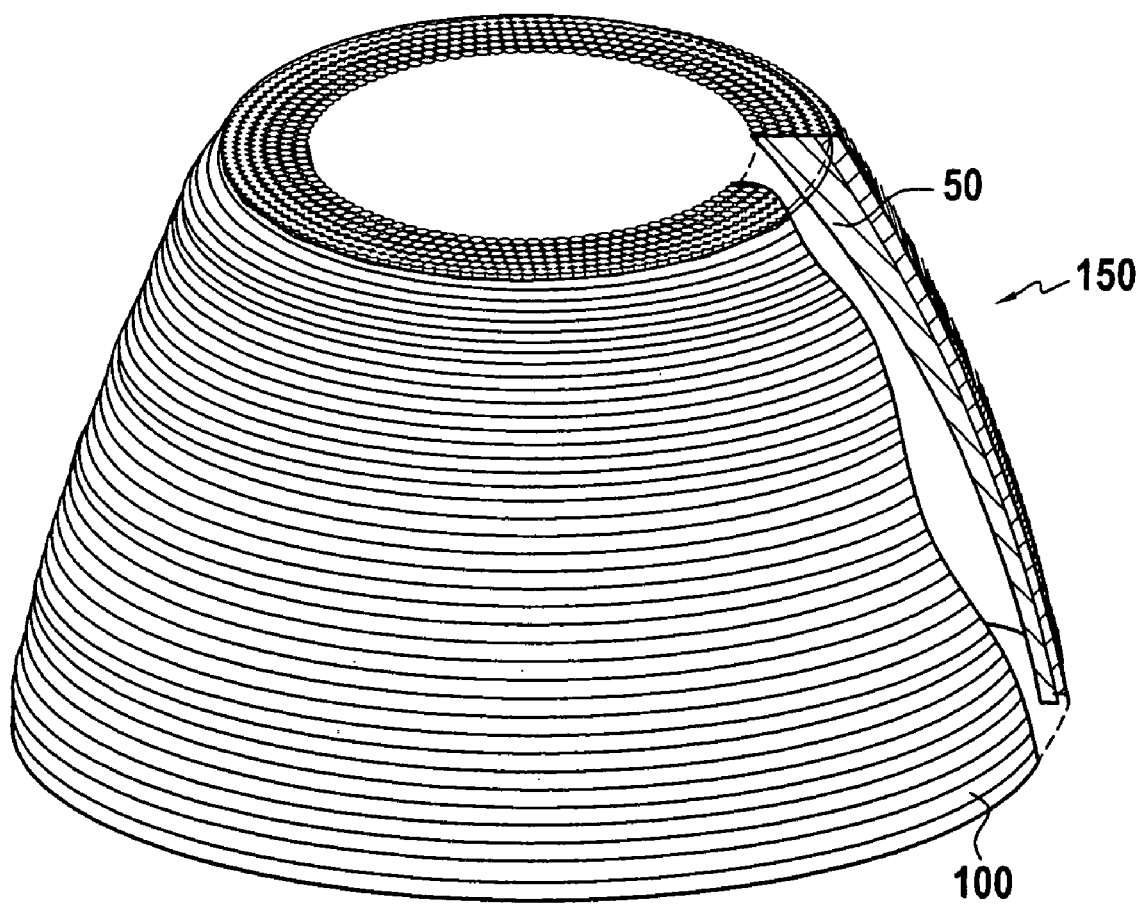
FIG. 20 is a partially cut-away perspective view of fiber reinforcement for a casing-and-diverging-portion unit formed by uniting a diverging portion fiber preform with a casing fiber preform.

As shown in FIG. 20, thereafter the first fiber preform 50 corresponding to the diverging portion is united with the second fiber preform 100 corresponding to the casing portion so as to form the fiber reinforcement 150 for the casing-and-diverging-portion unit.

In a variant implementation, the second preform for the casing may be formed directly on the first preform for the diverging portion. With a casing preform built up from plies at 0° and at 90°, the fiber preform corresponding to the diverging portion is made on a tool similar to the tool 70 that also includes a rim at its base for enabling the plies to be stacked at an angle of β of about 10°, as described above. The preform corresponding to the casing is then formed by placing on the preform for the diverging portion at least one ply at 0° and one ply at 90° made by winding on the ply at 0°, as explained above. With a casing preform made of plies each comprising two series of fibers at angles α and −α, these plies are placed directly on the preform of the diverging portion.

The following step of the method of making the casing-and-diverging-portion unit in accordance with the present invention consists in densifying the fiber reinforcement 150 with a common matrix in a single operation. For this purpose, the reinforcement 150 is impregnated with a thermosetting resin that is polymerized by heat treatment.

For this purpose, the well-known method of resin transfer molding (RTM) is used that consists in impregnating the fiber reinforcement with a resin and in causing it to polymerize in the same mold. To implement the RTM method in the context of the present invention, special tooling 200 as shown in FIGS. 21 and 22 has been developed so as to enable a resin to be injected into the fiber reinforcement of the casing-and-diverging-portion unit, and then polymerized.

Figure 21:
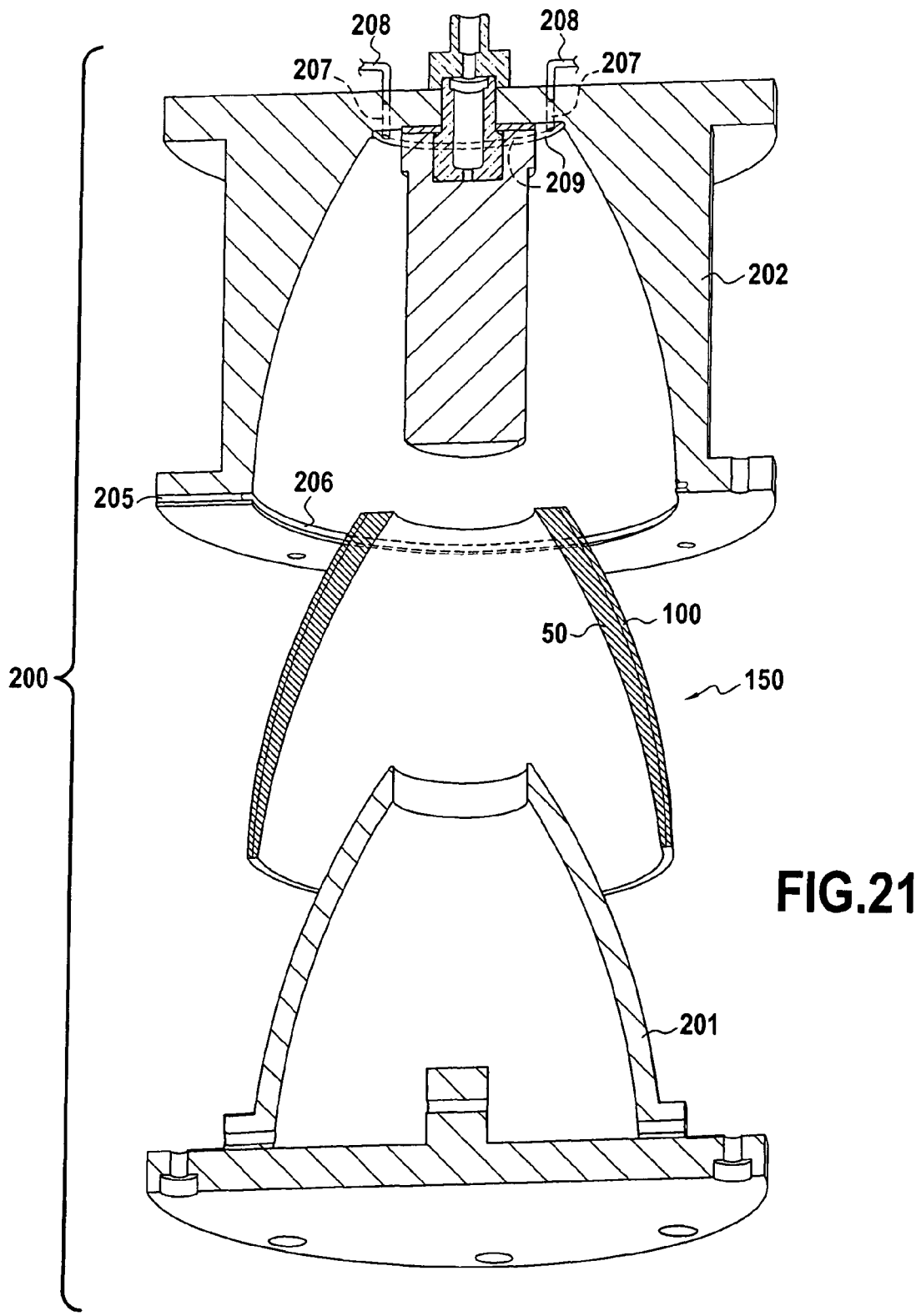
FIG. 21 is a perspective view showing the tooling used for injecting and polymerizing resin in the fiber preform.

More precisely, as shown in FIG. 21, the tooling 200 comprises a mold core 201 and an outer mold 202, e.g. made of steel, with the fiber reinforcement 150 made up of the first and second fiber preforms 50 and 100 being placed between them.

Figure 22:
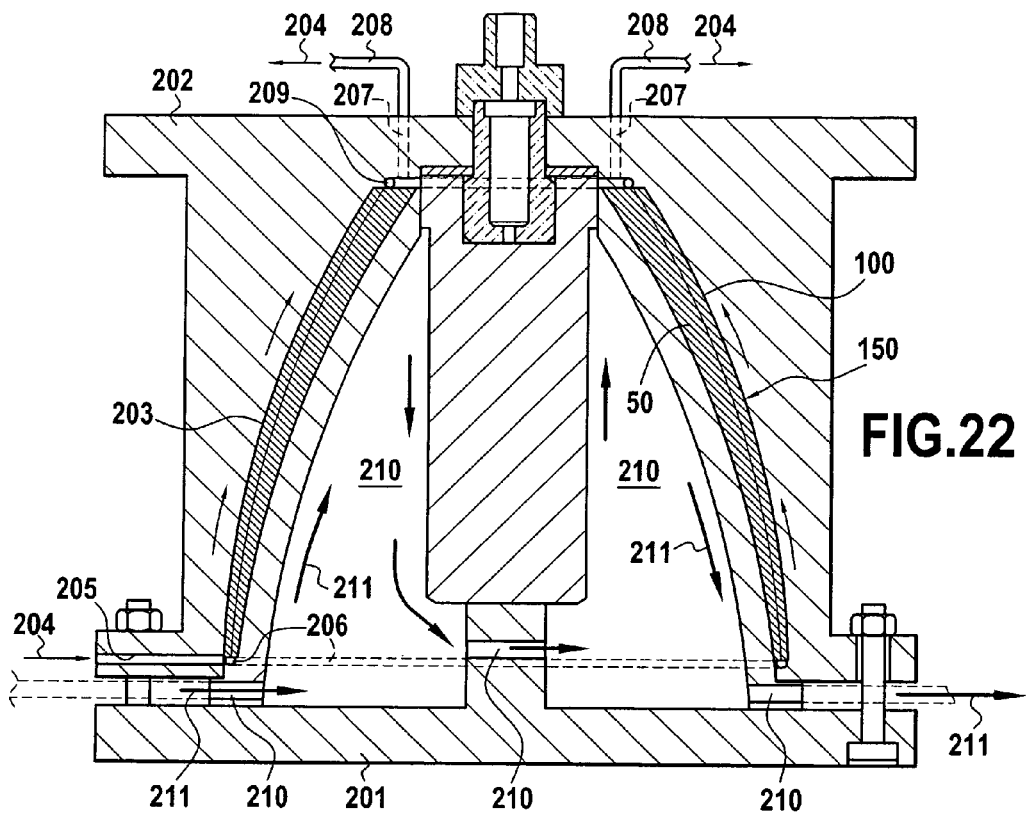
FIG. 22 is a fragmentary diagrammatic view in section showing resin being injected into the fiber preform.

Once assembled together as shown in FIG. 22, the core 201 and the outer mold 202 define an internal space 203 that is occupied by the reinforcement 150 and into which a resin 204 is injected via a feed orifice 205 formed in the bottom portion of the outer mold 202. Injection pressure is controlled at the feed orifice 205. The feed orifice 205 communicates with a circular channel 206 that serves to distribute the resin over the entire periphery of the base of the reinforcement 150. In its top portion, the outer mold 202 also includes a circular channel 209 communicating with orifices 207, e.g. three such orifices, which are connected to exhaust ducts 208 under a partial vacuum. This configuration enables a pressure gradient to be established between the bottom portion of the reinforcement 150 into which the resin is injected and the top portion of the reinforcement situated close to the orifices 207. In this way, the thermosetting resin 204 injected via the large diameter of the reinforcement 150 progressively impregnates the entire reinforcement by flowing in the space 203 up to the circular channel 209 where any surplus resin present is removed via the orifices 207. The tooling 200 is kept closed by a hydraulic pressure (not shown in the figures).

In order to initiate polymerization of the resin injected into the fiber reinforcement, the tooling needs to be raised to and maintained at a temperature corresponding to the polymerization temperature of the resin used. For this purpose, the tooling 200 includes heater means that may be of various types (resistive, inductive, etc.). In the embodiment of the tooling shown herein, the core of the tooling is heated by a flow circuit 210 formed inside the mold core 201 and in which hot oil 211 is caused to circulate. The resin is injected into the tooling at an appropriate injection temperature by heating the injection head (not shown in the figures) that is connected to the feed orifice 205. An additional advantage of using circulating oil as heater means is that the oil also serves to regulate the temperature in the reinforcement, since once polymerization has been triggered it can lead to an exothermal reaction.

The resin used in the present invention needs to ensure that the final part, corresponding to the casing-and-diverging-portion unit, has formed therein a matrix that presents the ability to withstand both mechanical forces and ablation. For this purpose, the resin used is a polyaddition resin that presents, once polymerized, structural characteristics that are useful in particular for the casing portion of the final part. This resin also presents a coke fraction of at least 50%, which makes it possible to ensure that the matrix formed after polymerization withstands ablation well, as is necessary in particular for the diverging portion whose inside wall is subjected to the flow of combustion gases.

In addition, the resin must be suitable for RTM methods, i.e. it should preferably present low viscosity so as to make it easier to inject into the fibers of the reinforcement. By way of example, the resin used may be a cyanate ester resin of the phenolic triazine type.

After injection and polymerization, the part is unmolded. It may optionally be subjected to a post-baking cycle to improve its thermomechanical characteristics (increasing its glass transition temperature), such as, for example, a cycle of 2 hours at 180° C. In the end, the part is trimmed to remove excess resin and its chamfers are machined. No other machining is needed since, because the part is molded, it complies with the required dimensions.

Figure 23:
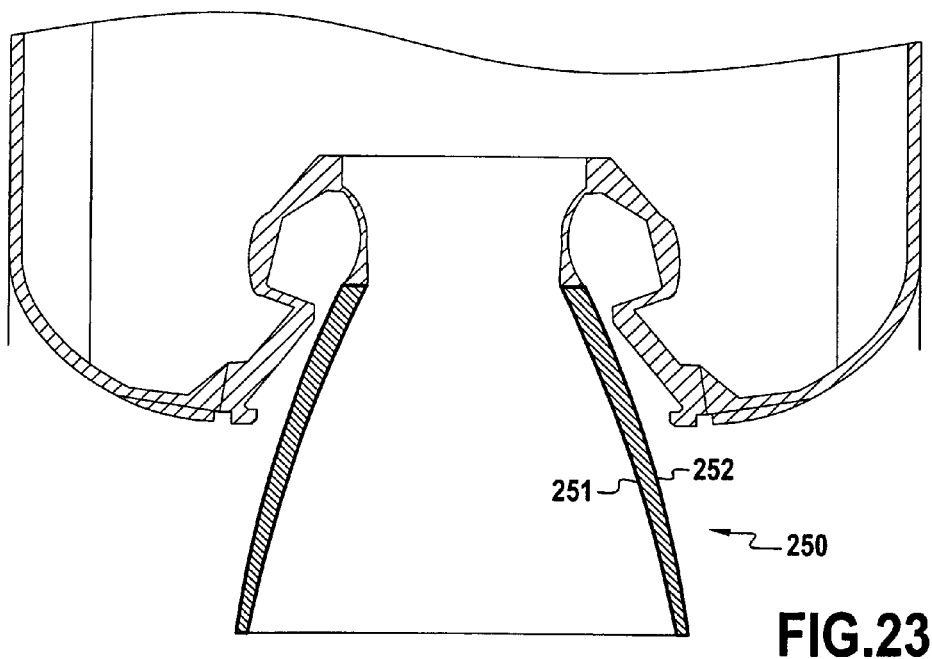
FIG. 23 is a diagrammatic section view of a rear portion of a thruster fitted with a casing-and-diverging-portion unit made in accordance with the method of the invention.

As shown in FIG. 23, a single part constituting a casing-and-diverging-portion unit 250 is then available that can be used directly for fitting to a thruster, the unit 250 having an internal portion 251 made of a first type of fiber selected mainly for its thermal characteristics to withstand the hot gas of the thruster, and an external portion 252 made of a second type of fiber selected mainly for its structural characteristics so as to confer good stiffness and withstand mechanical forces.

What is claimed is:

1. A method of making a casing-and-diverging-portion unit, the method comprising the following steps:
   forming a fiber reinforcement by making a first fiber preform with a plurality of annular fiber plies formed as rings with a first type of fiber, the plies being stacked in a direction along a longitudinal axis of the unit, said first preform corresponding to the diverging portion of the casing-and-diverging-portion unit that is to be made, and making a second fiber preform with a second type of fiber, different from the first type of fiber, said second preform corresponding to the casing portion of the casing-and-diverging-portion unit that is to be made, and being placed on the first preform;
   maintaining the fiber reinforcement in a shape identical to that of the casing-and-diverging-portion unit that is to be made; and
   impregnating said fiber reinforcement with a thermosetting resin and polymerizing the resin.

2. A method according to claim 1, wherein the first fiber preform is made with fibers presenting thermal conductivity that is less than 50 $W.m^{-1}.K^{-1}$.

3. A method according to claim 2, wherein the first fiber preform is made with pitch-precursor carbon fibers or with PAN-precursor carbon fibers, or with rayon-precursor carbon fibers.

4. A method according to claim 1, wherein the second fiber preform is made with fibers presenting traction strength of at least 3000 MPa and a Young's modulus of at least 200 GPa.

5. A method according to claim 4, wherein the second fiber preform is made with PAN-precursor carbon fibers or with pitch-precursor carbon fibers.

6. A method according to claim 1, wherein the thermosetting resin is a polyaddition resin having structural characteristics and a coke fraction of at least 50%.

7. A method according to claim 1, wherein each one of the plurality of annular fiber plies comprise at least a first series of fibers oriented at an angle $\alpha$ and a second series of fibers oriented at an angle $-\alpha$.

8. A method according to claim 7, wherein the first fiber preform is made by stacking said annular fiber plies on tooling of egg-cup or conical shape, each ply being disposed on said tooling at an angle $\beta$ relative to the axis of the tooling.

9. A method according to claim 7, wherein said first and second series of fibers of each annular fiber ply are made by automatic placement and stitching of fibers between two canvases defining an annular space, each ply being extracted from the canvases by being cut out after a circular connection has been made in said ply.

10. A method according to claim 1, wherein the second preform is made from at least first and second superposed fiber plies, the first ply having fibers oriented in a determined direction, the second ply being made by disposing on the first ply a ply of fibers that are oriented perpendicularly to the fibers of the first ply.

11. A method according to claim 10, wherein the first ply is made by automatic placing and stitching of fibers between two canvases defining an annular space, the ply being extracted from the canvases by being cut out after a circular connection has been made in said ply, and wherein the second ply is made by filamentary winding on the first ply while it is held in shape on conical tooling.

12. A method according to claim 1, wherein the second fiber preform is made from at least one fiber ply comprising at least first and second series of superposed fibers, the first series having fibers oriented at an angle $\alpha$ and a second series having fibers oriented at an angle $-\alpha$.

13. A method according to claim 12, wherein said first and second series of fibers of each fiber ply are made by automatic placing and stitching of fibers between two canvases defining an annular space, each ply being extracted from the canvases by being cut out after making a circular connection in said ply.

14. A method according to claim 1, wherein the first and second preforms are made independently of each other, said second preform being placed on said first preform in order to form the fiber reinforcement.

15. A method according to claim 1, wherein the second fiber preform is made directly on the first fiber preform in order to form the fiber reinforcement.

16. A method according to claim 1, wherein the fiber reinforcement made up of the superposed first and second fiber preforms is placed in tooling, the tooling comprising a mold core and an outer mold defining an internal space in which the reinforcement is held, and wherein the thermosetting resin is injected into the base of the reinforcement, with a pressure gradient being established in said internal space so as to cause the resin injected into the base of the reinforcement to flow towards the top of said reinforcement.

17. A method according to claim 16, wherein the tooling includes heater means for maintaining the fiber reinforcement at a temperature that is substantially uniform.

18. A method according to claim 17, wherein the tooling is heated by circulating a temperature-regulated fluid.

* * * * *

UNITED STATES PATENT AND TRADEMARK OFFICE
CERTIFICATE OF CORRECTION

| | |
|---|---|
| PATENT NO. | : 8,062,452 B2 |
| APPLICATION NO. | : 12/002339 |
| DATED | : November 22, 2011 |
| INVENTOR(S) | : Joëlle Lalande et al. |

It is certified that error appears in the above-identified patent and that said Letters Patent is hereby corrected as shown below:

Column 5, line 30, "l" should read -- $\ell$ --; and

Column 7, line 3, "l" should read -- $\ell$ --.

Signed and Sealed this
Twenty-fifth Day of December, 2012

David J. Kappos
*Director of the United States Patent and Trademark Office*